(12) United States Patent
Ogura et al.

(10) Patent No.: US 12,358,134 B2
(45) Date of Patent: Jul. 15, 2025

(54) PROGRAMMING DEVICE

(71) Applicant: Fanuc Corporation, Yamanashi (JP)

(72) Inventors: Shoutarou Ogura, Yamanashi (JP); Yuta Namiki, Yamanashi (JP); Hiromitsu Takahashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 247 days.

(21) Appl. No.: 17/928,998

(22) PCT Filed: Jun. 1, 2021

(86) PCT No.: PCT/JP2021/020897
§ 371 (c)(1),
(2) Date: Dec. 1, 2022

(87) PCT Pub. No.: WO2021/246416
PCT Pub. Date: Dec. 9, 2021

(65) Prior Publication Data
US 2023/0219223 A1    Jul. 13, 2023

(30) Foreign Application Priority Data
Jun. 5, 2020 (JP) .................. 2020-098761

(51) Int. Cl.
*B25J 9/16* (2006.01)
*G06F 8/34* (2018.01)

(52) U.S. Cl.
CPC .......... *B25J 9/1658* (2013.01); *B25J 9/1697* (2013.01); *G06F 8/34* (2013.01)

(58) Field of Classification Search
None
See application file for complete search history.

(56) References Cited

U.S. PATENT DOCUMENTS 11,121,937 B2 * 9/2021 Tokuchi ................ H04L 41/085
2006/0117324 A1    6/2006 Alsafadi et al.
(Continued)

FOREIGN PATENT DOCUMENTS

CN    109760042 A    5/2019
CN    111273572 A    6/2020
(Continued)

OTHER PUBLICATIONS

International Search Report and Written Opinion for International Application No. PCT/JP2021/020897, dated Aug. 10, 2021, 7 pages.

*Primary Examiner* — Thomas E Worden
*Assistant Examiner* — Bryant Tang
(74) *Attorney, Agent, or Firm* — Buchanan Ingersoll & Rooney PC

(57) ABSTRACT

Provided is a programming device capable of reducing the load of an operator that creates a control program including a command corresponding to a function of an imaging device. Provided is a programming device for programming industrial machinery, the programming device including: a command generation unit that acquires information regarding an imaging device connected to a control device of the industrial machinery and that, on the basis of the acquired information, generates an icon or command statement expressing a command using an image acquired by the imaging device; and a command display unit that displays the generated icon or command statement on a display screen.

8 Claims, 9 Drawing Sheets

(56) References Cited

U.S. PATENT DOCUMENTS

| | | |
|---|---|---|
| 2009/0187276 A1 | 7/2009 | Nagatsuka et al. |
| 2019/0143524 A1 | 5/2019 | Takahashi et al. |
| 2021/0252713 A1 | 8/2021 | Mimura et al. |

FOREIGN PATENT DOCUMENTS

| | | | | |
|---|---|---|---|---|
| EP | 2082850 A2 | * | 7/2009 | ............ B25J 9/1697 |
| JP | 08249026 A | | 9/1996 | |
| JP | 10315172 A | | 12/1998 | |
| JP | 2006510496 A | | 3/2006 | |
| JP | 6149400 B2 | * | 6/2017 | |
| JP | 6498366 B1 | | 4/2019 | |
| JP | 2020009204 A | | 1/2020 | |
| JP | 2020075354 A | | 5/2020 | |

\* cited by examiner

FIG. 8

```
1: L P[1] 2000mm/sec FINE ;
2: ;
3: VISION RUN_FIND 'A' ;
4: VISION GET_OFFSET 'A' VR[1] JMP LBL[100] ;
5: ;
6: !Handling ;
7: L P[2] 2000mm/sec CNT100 VOFFSET,VR[1] Tool_Offset,PR[1] ;
8: L P[2] 500mm/sec FINE VOFFSET,VR[1] ;
9: CALL HAND_CLOSE ;
10: L P[2] 2000mm/sec CNT100 VOFFSET,VR[1] Tool_Offset,PR[1] ;
11: ;
12: VISION RUN_FIND 'B' ;
13: VISION GET_OFFSET 'B' VR[2] JMP LBL [100] ;
14: ;
15: !Handling ;
16: L P[2] 2000mm/sec CNT100 VOFFSET,VR[2] Tool_Offset,PR[1] ;
17: L P[2] 500mm/sec FINE VOFFSET,VR[2] ;
18: CALL HAND_CLOSE ;
19: L P[2] 2000mm/sec CNT100 VOFFSET,VR[1] Tool_Offset,PR[1] ;
20:
```

| LINEAR |
| JOINT |
| CALL HAND_OPEN |
| CALL HAND_CLOSE |
| VISION RUN_FIND |
| VISION GET_OFFSET |
| ⋮ |

FIG. 9

```
1: L P[1] 2000mm/sec FINE ;
2: ;
3: CAMERA_A VISION RUN_FIND 'A' ;
4: CAMERA_A VISION GET_OFFSET 'A' VR[1] JMP LBL[100] ;
5: ;
6: !Handling ;
7: L P[2] 2000mm/sec CNT100 CAMERA_A VOFFSET,VR[1] Tool_Offset,PR[1] ;
8: L P[2] 500mm/sec FINE CAMERA_A VOFFSET,VR[1] ;
9: CALL HAND_CLOSE ;
10: L P[2] 2000mm/sec CNT100 CAMERA_A VOFFSET,VR[1] Tool_Offset,PR[1] ;
11: ;
12: ;
13: CAMERA_B VISION RUN_FIND 'B' ;
14: CAMERA_B VISION GET_OFFSET 'B' VR[2] JMP LBL [100] ;
15: ;
16: !Handling ;
17: L P[2] 2000mm/sec CNT100 CAMERA_B VOFFSET,VR[2] Tool_Offset,PR[1] ;
18: L P[2] 500mm/sec FINE CAMERA_B VOFFSET,VR[2] ;
19: CALL HAND_CLOSE ;
20: L P[2] 2000mm/sec CNT100 CAMERA_B VOFFSET,VR[2] Tool_Offset,PR[1] ;
21:
```

400B
300B

| LINEAR |
| JOINT |
| CALL HAND_OPEN |
| CALL HAND_CLOSE |
| CAMERA_A VISION RUN_FIND |
| CAMERA_B VISION RUN_FIND |
| CAMERA_A VISION GET_OFFSET |
| CAMERA_B VISION GET_OFFSET |
| ⋮ |

200B

PROGRAMMING DEVICE

CROSS REFERENCE TO RELATED APPLICATIONS

This is the U.S. National Phase application of PCT/JP2021/020897, filed Jun. 1, 2021 which claims priority to Japanese Patent Application No. 2020-098761, filed Jun. 5, 2020, the disclosures of these applications being incorporated herein by reference in their entireties for all purposes.

FIELD OF THE INVENTION

The present invention relates to a programming device for an industrial machine.

BACKGROUND OF THE INVENTION

Since it is a common practice to perform programming of a robot using a text-based statement, an operator may preferably have knowledge of a programming language for the robot. To support intuitive input by an operator of a control program for a robot, a program creation device that allows programming using an icon representing each statement of robot control has been proposed (see, e.g., PTL 1).

PATENT LITERATURE

[PTL 1] Japanese Patent No. 6498366 B

SUMMARY OF THE INVENTION

A set of instructions for programming in a robot system including an imaging device includes an instruction corresponding to a function for capturing an image of a workpiece using the imaging device, processing the captured image, and detecting the workpiece. Generally, when a statement corresponding to such a function that uses an imaging device is included in a control program for a robot, an operation for inserting a statement corresponding to a function that uses an imaging device into a control program for a robot may be preferably performed, and then an imaging device to be started in accordance with the statement may be preferably selected and set separately. The number of imaging devices placed in the robot system may be one or plural. In the latter case, an operator may preferably insert a plurality of statements corresponding to the functions of the imaging devices into the program, and then repeat selection of an imaging device to be started in accordance with each inserted statement, thus inflicting a heavier burden on the operator. In programming of a control program for an industrial machine, a demand has arisen for a programming device that can reduce the burden on an operator who creates a control program including an instruction corresponding to the function of an imaging device.

One aspect of the present disclosure provides a programming device for performing programming of an industrial machine, the device including an instruction generation section configured to acquire information concerning an imaging device connected to a controller for the industrial machine, and generate one of an icon and a statement representing an instruction to use an image captured by the imaging device, based on the acquired information, and an instruction display section configured to display the generated one of the icon and the statement on a display screen.

With the above-mentioned configuration, in programming of a control program for an industrial machine, it is possible to reduce the burden on an operator who creates a control program including an instruction corresponding to the function of an imaging device.

These and other objects, features, and advantages of the present invention will become more apparent from the following detailed description of an exemplary embodiment thereof, as illustrated in the accompanying drawings, in which:

BRIEF DESCRIPTION OF DRAWINGS

FIG. 8 is a diagram illustrating an exemplary text-based program creation screen in a general teaching device, as a comparative example.

FIG. 9 is a diagram illustrating an exemplary text-based program creation screen in this embodiment.

DETAILED DESCRIPTION OF EMBODIMENTS OF THE INVENTION

Figure 1:
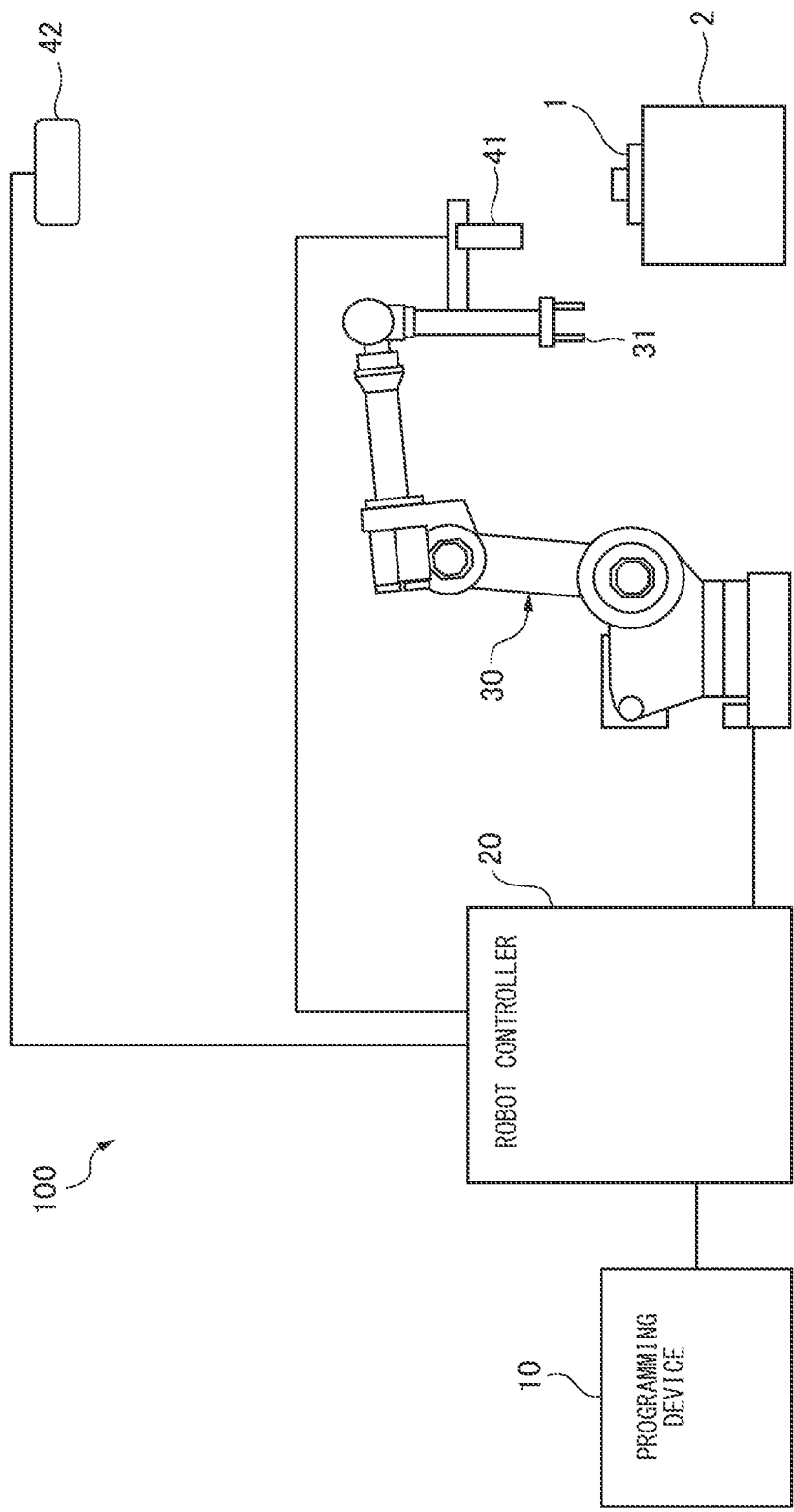
FIG. 1 is a diagram depicting the configuration of a robot system including a teaching device (programming device) according to one embodiment.

An embodiment of the present disclosure will be described below with reference to the drawings. In the drawings to be referred to, the same or similar reference numerals denote the same or similar components or functional parts. To facilitate understanding, these drawings use different scales as appropriate. Further, the modes illustrated in the drawings are merely examples for carrying out the present invention, which is not limited to the modes illustrated in the drawings.

FIG. 1 is a diagram depicting the configuration of a robot system 100 including a teaching device (programming device) 10 according to one embodiment. The robot system 100 includes a robot 30 having a hand 31 mounted at its arm distal end, vision sensors 41 and 42, a robot controller 20 that controls the robot 30, and the teaching device 10 connected to the robot controller 20, as illustrated in FIG. 1. The robot 30 is implemented as a vertical articulated robot in this case, but other types of robots may be used. The robot controller 20 controls the motion of the robot 30 in accordance with a control program, or in response to a command issued from the teaching device 10. The robot controller 20 may have the configuration of a general computer including, e.g., a CPU, a ROM, a RAM, a storage device, an operation section, a display section, an I/O interface, and a network interface.

The vision sensor 41 is mounted at the arm distal end of the robot 30. The vision sensor 42 is fixed at a position that allows capture of an image of a workpiece 1 in a workspace in which the robot 30 is installed. In the robot system 100, the position of the workpiece 1 is detected by the vision sensors 41 and 42, and the workpiece 1 placed on a work table 2 is handled by the hand 31 of the robot 30.

The vision sensors 41 and 42 are connected to the robot controller 20 and operate under the control of the robot controller 20. The robot controller 20 also includes the function of an image processing device that acquires images captured by vision sensors (vision sensors 41 and 42) and perform image processing such as workpiece detection for the captured images. The robot controller 20 holds a model pattern for a workpiece, and detects the workpiece by pattern matching between the workpiece in the captured images and the model pattern. The robot controller 20 can compensate a teaching position based on the detected position of the workpiece 1 and perform, e.g., picking of the workpiece 1.

The vision sensors 41 and 42 may serve as cameras (2D cameras) that capture grayscale images or color images, or may serve as stereo cameras or three-dimensional sensors (3D cameras) that can capture range images or three-dimensional point clouds. As an example, this embodiment assumes that the vision sensor 41 serves as a 2D camera, and the vision sensor 42 serves as a 3D camera. FIG. 1 illustrates an example in which a total of two imaging devices: one 2D camera and one 3D camera are placed in the robot system 100, but the number of imaging devices provided in the robot system 100 may be one, or three or more. In addition, a plurality of imaging devices of the same type (e.g., a plurality of 2D cameras or a plurality of 3D cameras) may be placed in the robot system 100.

The teaching device 10 is used to create a control program for causing the robot 30 to handle the workpiece 1. The teaching device 10 may be implemented as, e.g., a tablet terminal or a teach pendant connected to the robot controller 20. Alternatively, the teaching device 10 may be implemented as a programming device (e.g., a PC) for performing programming offline. The teaching device 10 may have the hardware configuration of a general computer including, e.g., a CPU, a ROM, a RAM, a storage device, an I/O interface, and a network interface.

Figure 2:
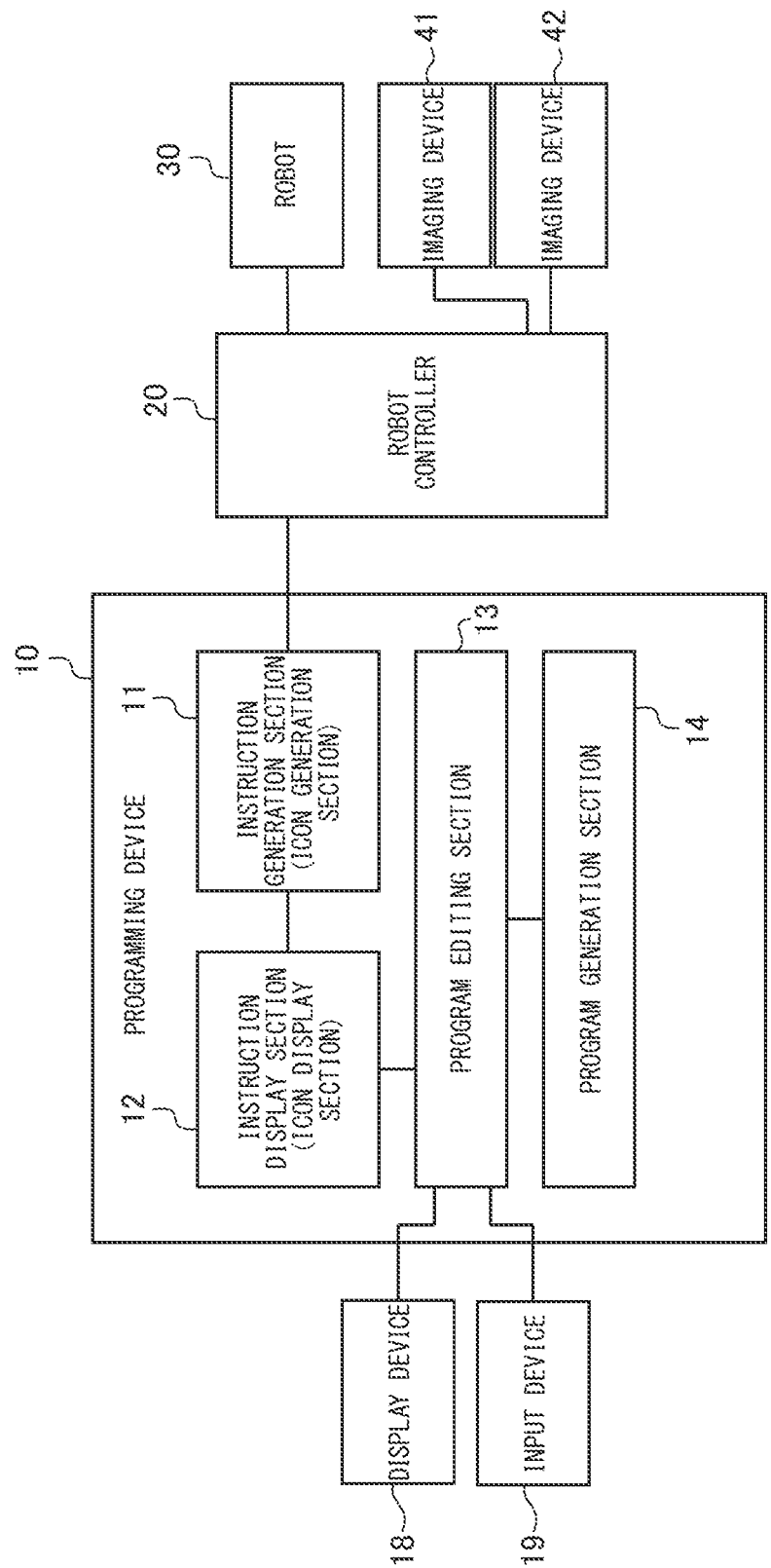
FIG. 2 is a functional block diagram of the teaching device.

FIG. 2 is a functional block diagram of the teaching device 10. FIG. 2 also depicts the connection relationship between the teaching device 10 and other devices. The teaching device 10 includes an instruction generation section 11, an instruction display section 12, a program editing section 13, and a program generation section 14, as illustrated in FIG. 2.

The instruction generation section 11 acquires information concerning one or more imaging devices connected to the robot controller 20 from the robot controller 20, and generates an icon or a statement representing an instruction to use an image captured by each of the one or more imaging devices, in a representational form that allows identification of each of the one or more imaging devices, based on the acquired information. The "information concerning an imaging device" means herein information (e.g., a product model) that allows identification of the type of each imaging device connected to the robot controller 20. Hence, the instruction generation section 11 can identify, e.g., a 2D camera (monochrome), a 2D camera (color), or a 3D camera as the type of imaging device provided in the robot system 100.

The "information concerning an imaging device" may further include information that allows identification of the installation position of the imaging device. An example of the information that allows identification of the installation position may be information indicating whether the imaging device serves as a camera (handheld camera) mounted on a robot, or a fixed camera fixed in the workspace. Since a connection cable for a camera mounted on a robot is generally wired through the interior of the robot and connected to a specific I/O interface of a robot controller, the robot controller can identify the installation position of the imaging device (whether the imaging device serves as a handheld camera or a fixed camera), based on which I/O interface the imaging device is connected to (e.g., information indicating which port the imaging device is connected to). More detailed position information (e.g., coordinate information of the imaging device in the workspace when the imaging device serves as a fixed camera) may be provided as the information representing the installation position of the imaging device.

Alternatively, when a robot is shipped upon mounting of an imaging device on the robot, information indicating that the camera used serves as, e.g., a handheld camera may be held in this camera as part of product information. In the robot system 100 having the configuration illustrated in FIG. 1, the instruction generation section 11 acquires, e.g., the following information from the robot controller 20 as information concerning the vision sensors 41 and 42:

Information Concerning Vision Sensor 41: 2D Camera (Color); Handheld Camera

Information Concerning Vision Sensor 42: 3D Camera; Fixed Camera

Upon acquiring the "information concerning an imaging device" as described above, the instruction generation section 11 can generate an icon or a statement of each imaging device in a representational form that allows identification of the types, the number, and the installation positions of imaging devices connected to the robot controller 20. The instruction display section 12 displays the above-mentioned icon or statement generated by the instruction generation section 11 in a predetermined display area of a display device 18.

The program editing section 13 displays, on the display device 18, an editing screen (program creation screen) for creating a control program for the robot 30, and receives an editing operation for the control program. The control program includes herein an instruction for controlling the robot 30, and an instruction associated with capture of an image by a vision sensor and processing of the captured image. The program generation section 14 generates a control program from an icon placed in a program creation area within the editing screen, or a statement described in the program creation area within the editing screen.

Figure 3:
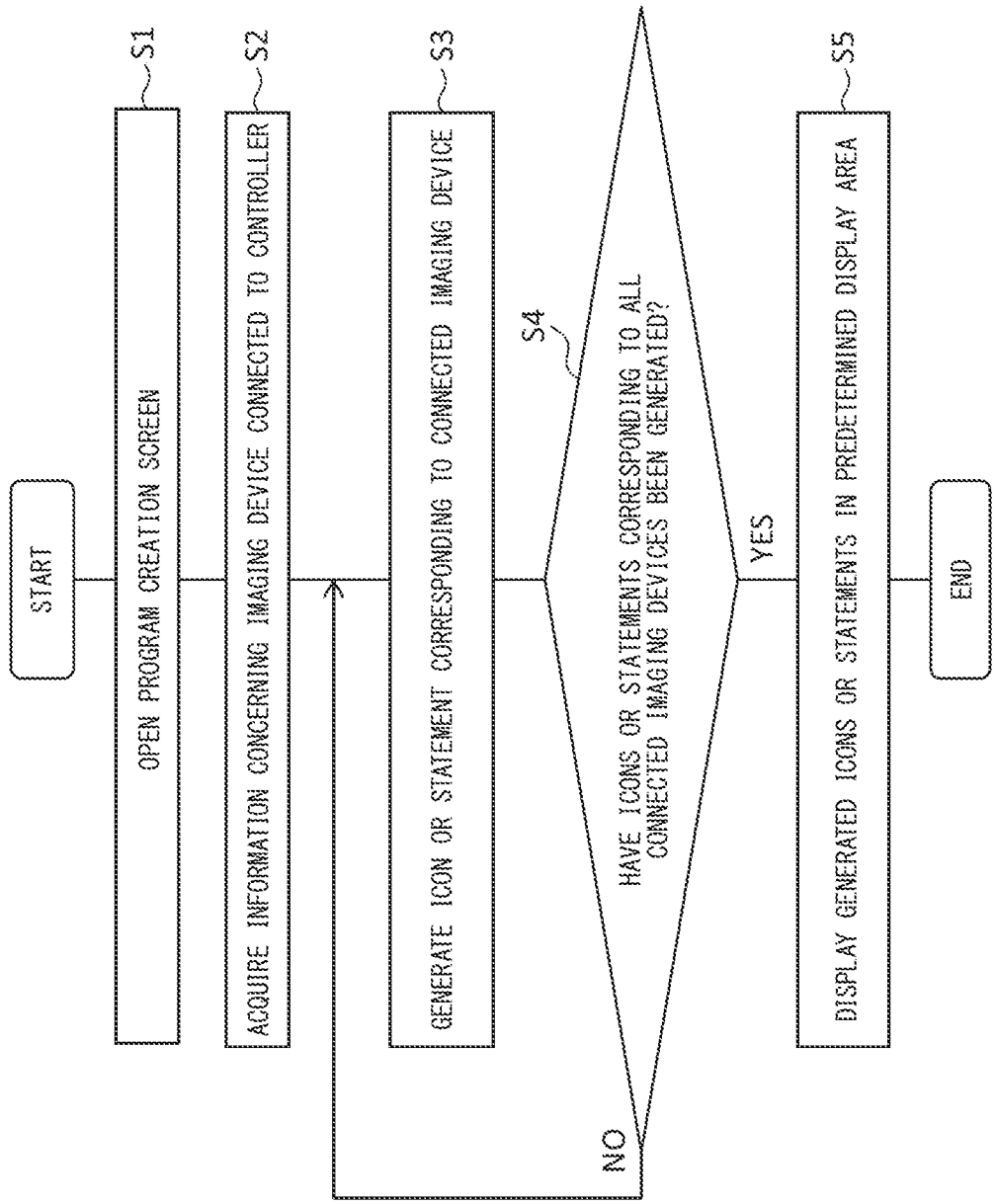
FIG. 3 is a flowchart illustrating instruction generation and display processing.

Two examples related to generation and display of an icon or a statement by the teaching device 10 will be given below. Example 1 illustrates an operation example when the teaching device 10 generates and displays an icon representing an instruction to use an image captured by an imaging device, and Example 2 illustrates an operation example when the teaching device 10 generates and displays a statement (text) representing an instruction to use an image captured by an imaging device. FIG. 3 is a flowchart illustrating processing (to be also referred to as "instruction generation and display processing" hereinafter) for generating and displaying an icon or a statement representing an instruction to use an image captured by an imaging device. Since the flowchart illustrated in FIG. 3 is common to Examples 1 and 2, these two examples will be described below with reference to the flowchart illustrated in FIG. 3, as appropriate. The processing illustrated in FIG. 3 is performed under the control of the CPU of the teaching device 10.

Example 1

Figure 4:
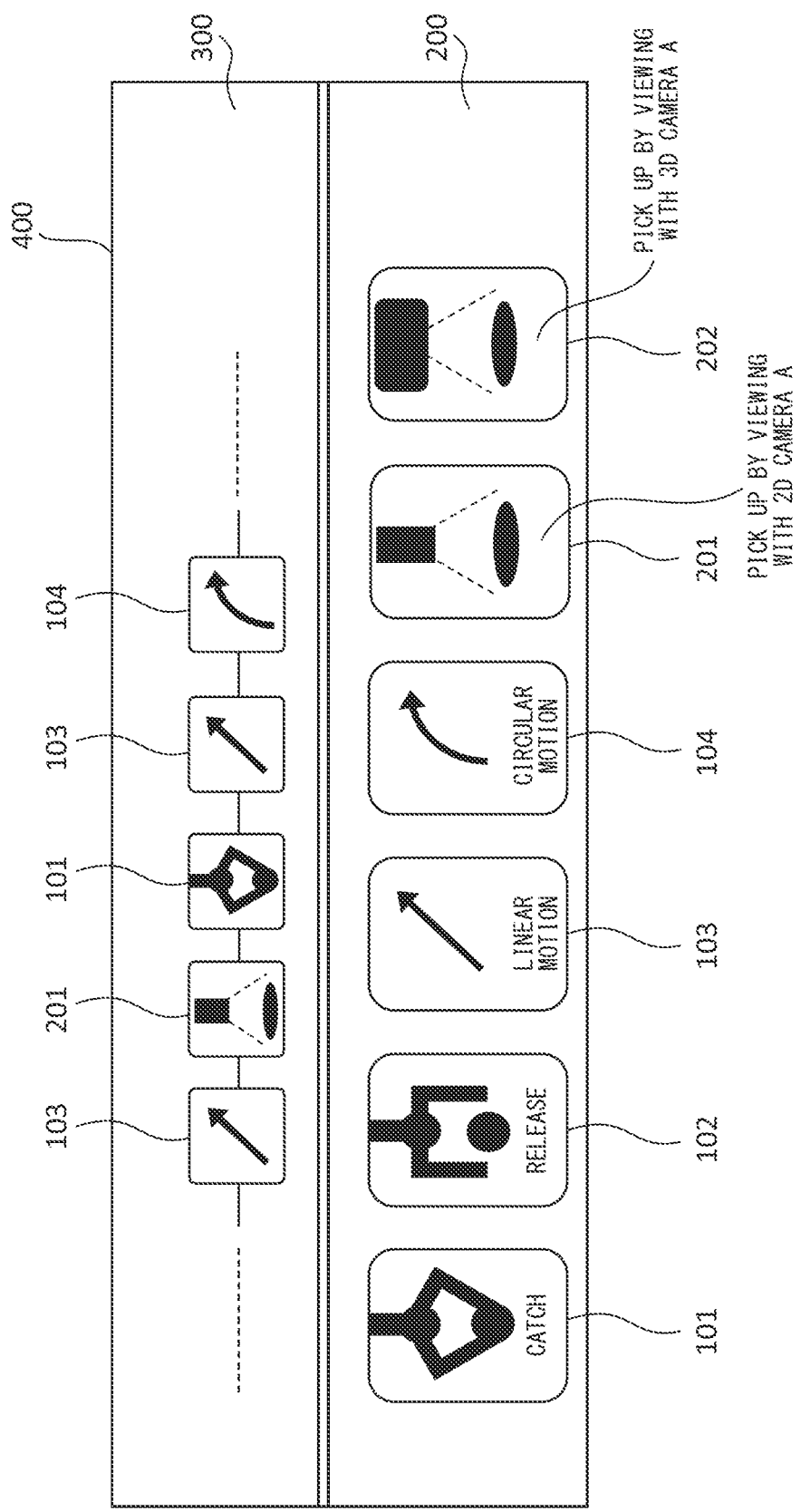
FIG. 4 illustrates a first example of generation and display of an icon of an imaging device by the instruction generation and display processing.
Figure 5:
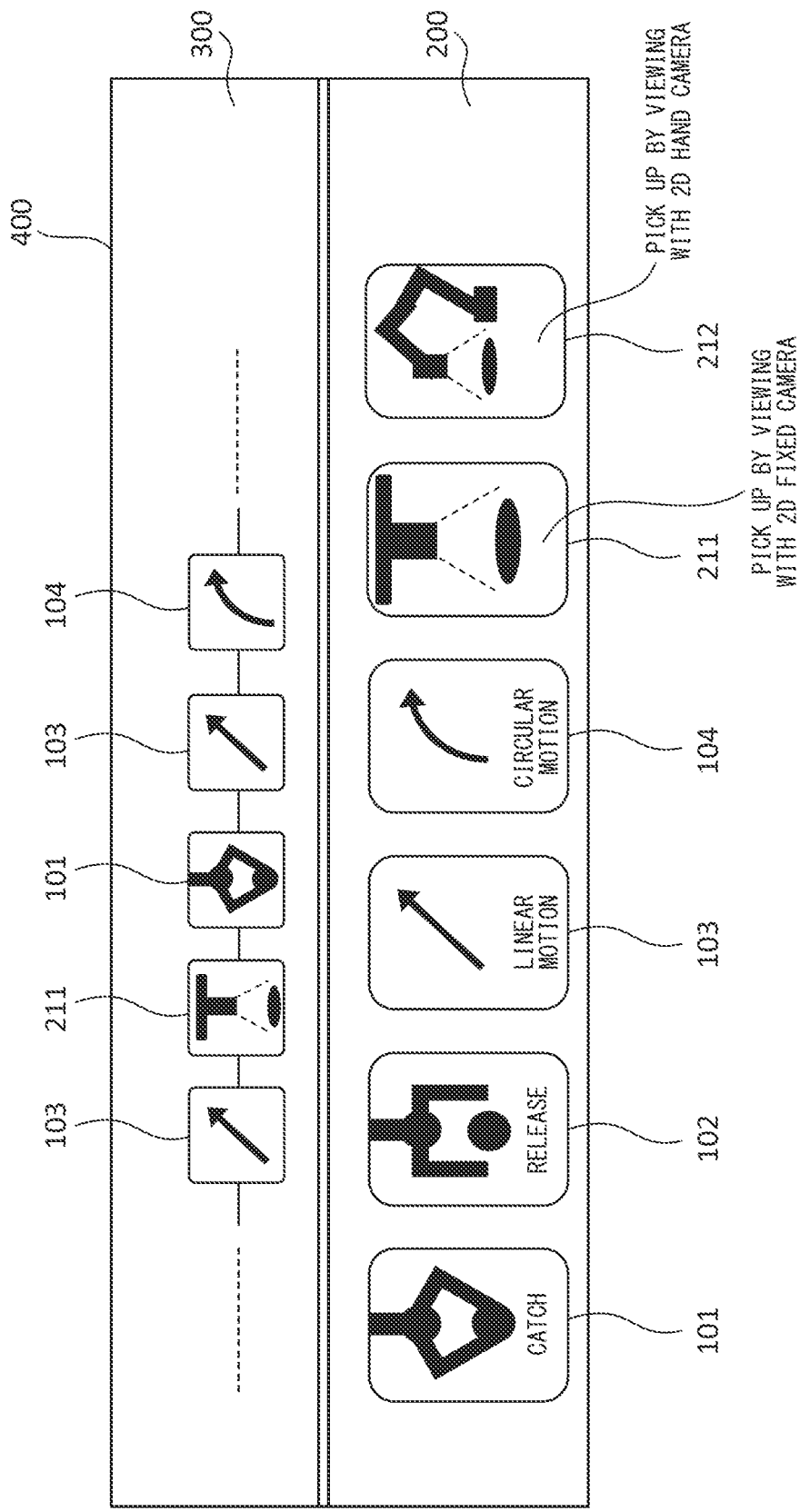
FIG. 5 illustrates a second example of generation and display of an icon of an imaging device by the instruction generation and display processing.

In Example 1, the teaching device 10 generates and displays an icon representing an instruction to use an image captured by an imaging device. In this case, the instruction generation section 11 functions as an icon generation section, and the instruction display section 12 functions as an icon display section. Upon the start of the teaching device 10, or in response to a predetermined operation performed on the teaching device 10 to open a program creation screen, the instruction generation and display processing illustrated in FIG. 3 is started. The teaching device 10 (program editing section 13) first displays a program creation screen (editing screen) 400 on the display device 18 (step S1). FIGS. 4 and 5 illustrate two examples of the program creation screen 400 created in this case. The program creation screen 400 includes a program creation area 300 and an icon display area 200, as illustrated in FIGS. 4 and 5.

The teaching device 10 (instruction generation section 11) then acquires information concerning an imaging device connected to the robot controller 20 from the robot controller 20 (step S2). The teaching device 10 (instruction generation section 11) generates an icon of the imaging device, based on the information concerning the imaging device (step S3).

The teaching device 10 (instruction generation section 11) confirms whether icons have been generated for all imaging devices connected to the robot controller 20, based on the information concerning the imaging device (step S4). The teaching device 10 (instruction generation section 11) repeats step S3 (NO in step S4), in which an icon is generated, until icons are generated for all imaging devices connected to the robot controller 20. When icons have been generated for all imaging devices connected to the robot controller 20 (YES in step S4), the process advances to step S5.

In step S5, the teaching device 10 (instruction display section 12) displays the icons generated by the above-mentioned processing in a predetermined display area (icon display area 200) (step S5). The icons referred to in this specification may include all graphical representations of instructions to various devices in the form of, e.g., figures, patterns, or symbols. Therefore, the icons include not only the examples given in this embodiment, but also, e.g., graphic objects (e.g., blocks used in graphic programming in puzzle form) like those used in a visual programming tool.

Two examples of generation and display of an icon of an imaging device by the instruction generation and display processing illustrated in FIG. 3 will be given below with reference to FIGS. 4 and 5.

FIG. 4 illustrates a first example of generation and display of an icon of an imaging device by the instruction generation and display processing. The program creation screen 400 includes an icon display area 200 for displaying a list of icons that can be used for programming, and a program creation area 300 for creating a control program by arranging the icons in the order of motion, as illustrated in FIG. 4. Assume herein that the vision sensor 41 serves as a 2D camera, and the vision sensor 42 serves as a 3D camera. In step S3, the teaching device 10 (instruction generation section 11) generates an icon 201 having a figure representing the appearance of a 2D camera, as an icon of the vision sensor 41 (2D camera). The icon 201 may be added with a text "Pick Up by Viewing with 2D Camera A" as words expressing the function of this icon, as illustrated in FIG. 4. The teaching device 10 (instruction generation section 11) further generates an icon 202 having a figure representing the appearance of a 3D camera, as an icon of the vision sensor 42 (3D camera). The icon 202 may be added with a text "Pick Up by Viewing with 3D Camera A" as words expressing the function of this icon, as illustrated in FIG. 4.

The teaching device 10 (instruction display section 12) displays the icons 201 and 202 in the icon display area 200, together with icons 101 to 104 for control (control program) of the robot 30. Since the icons 201 and 202 are designed to allow identification of the vision sensor 41 (2D camera) and the vision sensor 42 (3D camera), the operator can instantaneously know the types and number of available imaging devices (i.e., imaging devices connected to the robot controller 20) by viewing the icons 201 and 202 displayed in the icon display area 200. The program creation screen 400 may be provided with a button for performing an operation for switching between display and non-display of text information (e.g., "Catch" or "Release") added to each of the icons 101 to 104, 201, and 202.

The icons 101 to 104, 201, and 202 displayed in the icon display area 200 represent the following operation instructions:

Icon 101: Instruction to Close Hand and Catch Workpiece
Icon 102: Instruction to Open Hand
Icon 103: Instruction to Move Arm Distal End of Robot in Linear Path
Icon 104: Instruction to Move Arm Distal End of Robot in Circular Path
Icon 201: Detect Position of Workpiece by 2D Camera
Icon 202: Detect Position of Workpiece by 3D Camera The program editing section 13 receives an operation, by the operator, for placing the icons displayed in the icon display area 200 in the program creation area 300 by a drag-and-drop operation. The program generation section 14 generates a control program in accordance with the icons placed in the program creation area 300. In the program creation area 300 illustrated in FIG. 4, the icon 103, the icon 201, the icon 101, the icon 103, and the icon 104 are arranged in the order of motion. In this control program, a motion is executed in which the arm distal end of the robot 30 is linearly moved to a target position, the position of a workpiece is detected by a 2D camera, a teaching position is compensated based on the detected position, and the workpiece is gripped and moved by the hand 31.

FIG. 5 illustrates a second example of generation and display of an icon of an imaging device by the instruction generation and display processing. Assume herein that both of the vision sensors 41 and 42 serve as 2D cameras. In this case, information concerning an imaging device acquired from the robot controller 20 by the teaching device 10 (instruction generation section 11) includes not only the type of imaging device, but also information concerning the installation position of the imaging device. The teaching device 10 (instruction generation section 11) determines that the vision sensor 41 serves as a handheld camera placed at the arm distal end of the robot 30, and the vision sensor 42 serves as a fixed camera fixed in the workspace, based on the information concerning the imaging device acquired from the robot controller 20.

With this operation, the teaching device 10 (instruction generation section 11) generates an icon 212 including a figure that reminds the operator that the vision sensor 41 serves as a camera mounted at the arm distal end of a robot, as an icon of the vision sensor 41. The icon 212 may be added with words (in this case, "Pick Up by Viewing with 2D Handheld Camera") that facilitate understanding of the function and the installation position indicated by the icon 212, as illustrated in FIG. 5. The teaching device 10 (instruction generation section 11) further generates an icon 211 having a figure that reminds the operator that the vision sensor 42 serves as a fixed camera, as an icon of the function implemented by the vision sensor 42. The icon 211 may be added with words (in this case, "Pick Up by Viewing with 2D Fixed Camera") that facilitate understanding of the function and the installation position indicated by the icon 211, as illustrated in FIG. 5.

The teaching device 10 (instruction display section 12) displays the icons 211 and 212 in the icon display area 200, together with icons 101 to 104 for control of the robot 30. Since the icons 211 and 212 are designed to allow identification of the vision sensor 41 (handheld camera) and the vision sensor 42 (fixed camera), the operator can instantaneously know the types, number, and installation positions of available imaging devices (i.e., imaging devices connected to the robot controller 20) by viewing the icons 211 and 212 displayed in the icon display area 200.

The program editing section 13 receives an operation, by the operator, for placing the icons displayed in the icon display area 200 in the program creation area 300 by a drag-and-drop operation. The program generation section 14 generates a control program in accordance with the icons placed in the program creation area 300. In the program creation area 300 illustrated in FIG. 5, the icon 103, the icon 211, the icon 101, the icon 103, and the icon 104 are arranged in the order of motion. In this control program, a motion is executed in which the arm distal end of the robot 30 is linearly moved to a target position, the position of a workpiece is detected by a 2D fixed camera, a teaching position is compensated based on the detected position, and the workpiece is gripped and moved by the hand 31.

Figure 6:
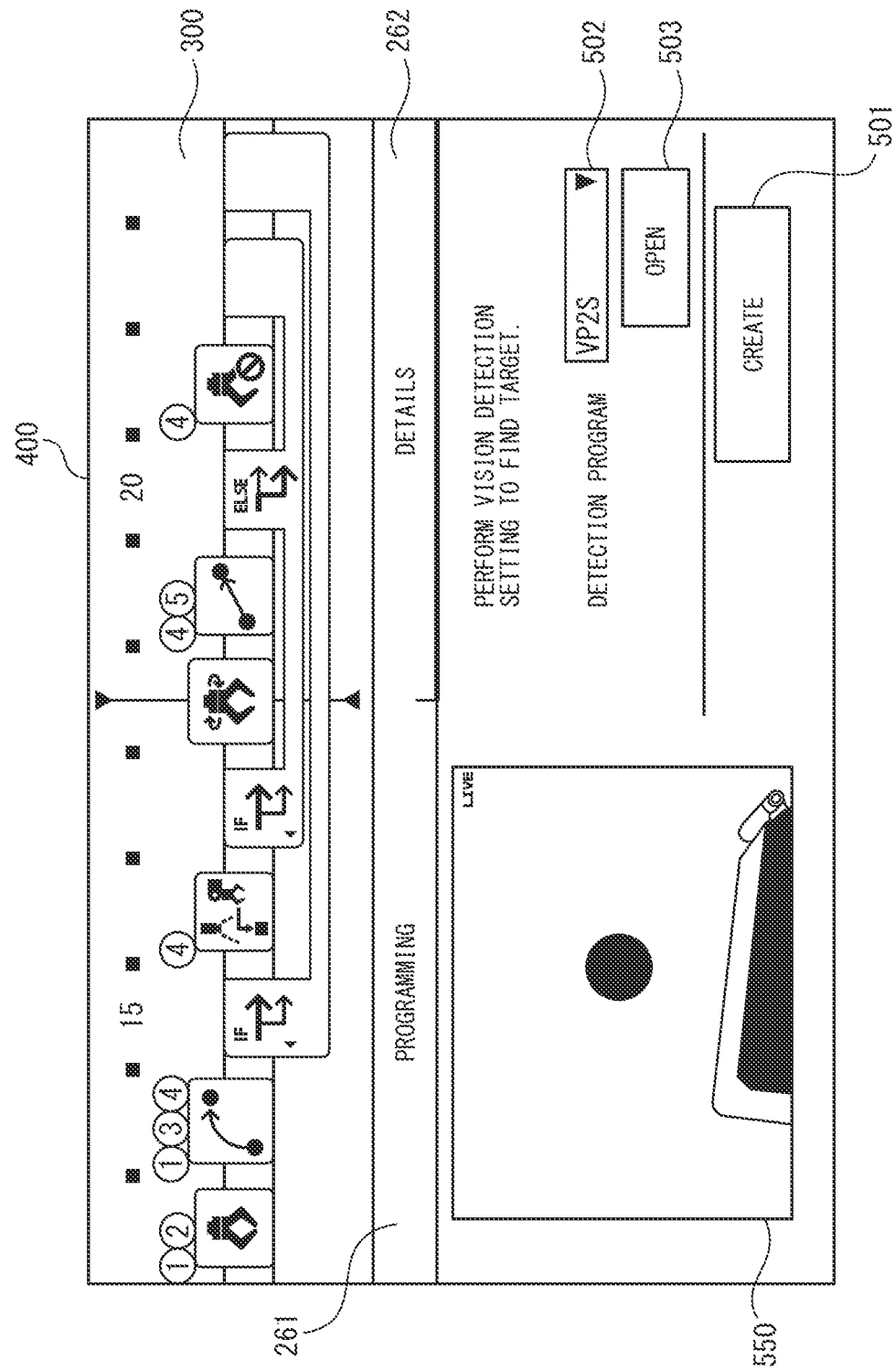
FIG. 6 illustrates an exemplary screen displayed when a Details tab is pressed in a program creation screen.

An operation executed when detailed programming is performed for the icons (icons 201 and 202 or icons 211 and 212) associated with the function of an imaging device (an instruction to use an image captured by an imaging device) generated by the instruction generation section 11 will be described below. FIG. 6 illustrates, as the program creation screen 400 as illustrated in FIG. 4 or 5, an exemplary program creation screen 400 in which the operator selects an icon (e.g., the icon 201) associated with the function of an imaging device placed in the program creation area 300, and presses a details tab 262 provided in the program creation screen 400. In this case, a create button 501 and a drop-down menu 502 appear in the lower region of the program creation screen 400, as illustrated in FIG. 6. In creating a new detailed program associated with the function of an imaging device, the operator presses the create button 501. A program associated with the function of an imaging device registered in the teaching device 10 is displayed in the drop-down menu 502. The operator can open a desired program by selecting this program from the drop-down menu 502 and pressing an open button 503.

Alive image 550 of an imaging device corresponding to the icon (e.g., the icon 201) selected in the program creation area 300 may be displayed in the lower region of the program creation screen 400 illustrated in FIG. 6. With such a configuration, the operator can more reliably recognize which imaging device corresponds to the icon selected in the program creation area 300 by viewing the live image 550. Such a display function of the live image 550 may be implemented by, e.g., using the program editing section 13 to request of the robot controller 20 transmission of a live image of an imaging device corresponding to the icon selected in the program creation area 300.

When a programming tab 261 is selected in the program creation screen 400 illustrated in FIG. 6, the lower region of the program creation screen 400 returns to the icon display area 200 that displays a list of icons, and a return, in turn, is made to the state in which the operator can perform programming of a robot.

Figure 7:
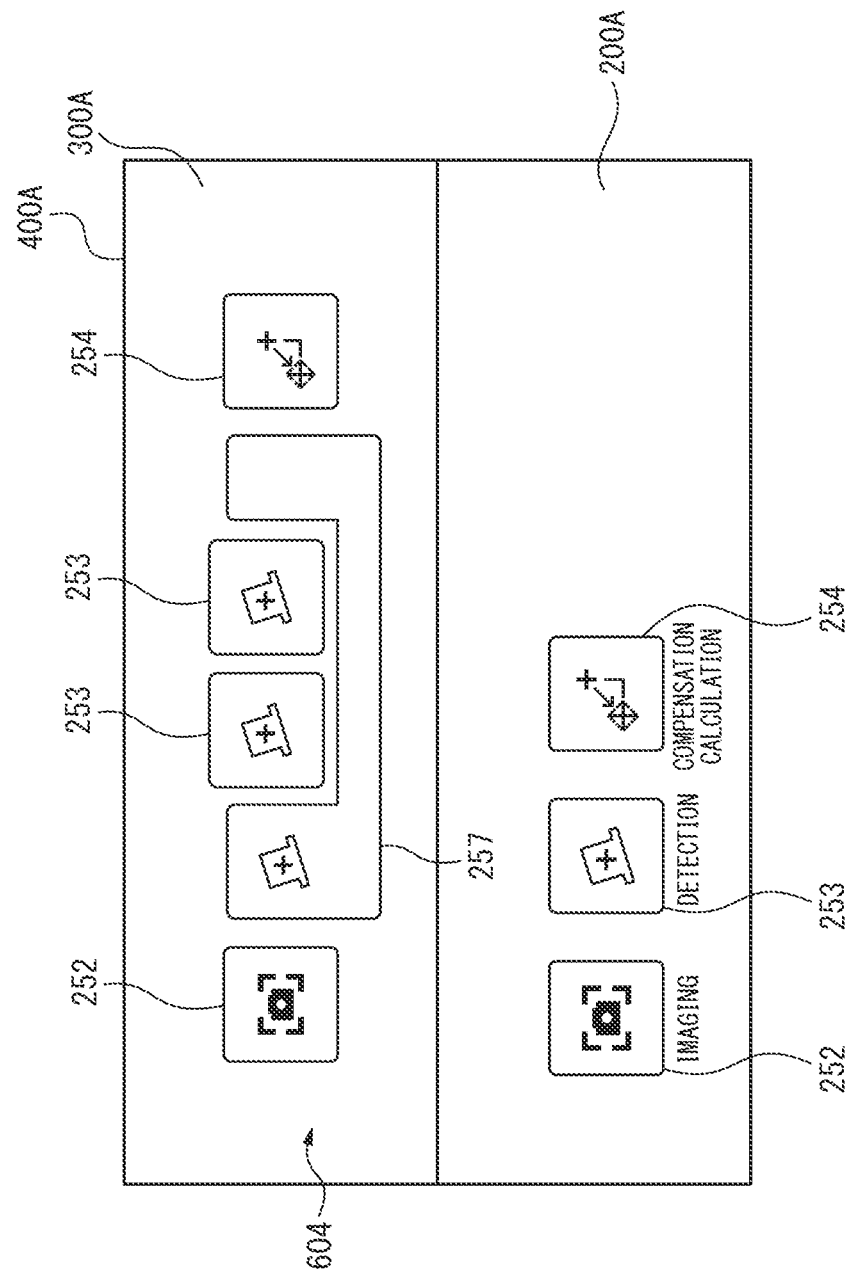
FIG. 7 illustrates an exemplary program creation screen for detailed programming associated with the function of an imaging device.

FIG. 7 illustrates a program creation screen 400A for detailed programming associated with the function of an imaging device, displayed upon pressing of the create button 501 or the open button 503 in the screen illustrated in FIG. 6. The program creation screen 400A associated with the function of an imaging device also has the same screen configuration as that of the program creation screen 400 used in creating a control program for a robot, as illustrated in FIG. 7. The program creation screen 400A includes an icon display area 200A for displaying an icon associated with control of an imaging device, and a program creation area 300A for creating a detailed program for a function associated with the imaging device. As in the case where a control program for a robot is edited, the operator can create a detailed program associated with the function of an imaging device by selecting icons from the icon display area 200A, and arranging them in the program creation area 300A by a drag-and-drop operation.

In the example illustrated in FIG. 7, the icons displayed in the icon display area 200A include an imaging icon 252 representing a function associated with imaging, a detection icon 253 representing a function for detecting a workpiece, and a compensation calculation icon 254 representing calculation of an amount of compensation. The operator can perform a predetermined operation by selecting each icon placed in the program creation area 300A, display a parameter setting screen in the lower portion of the program creation screen 400A, and perform detailed parameter setting. Parameter setting of the imaging icon 252 is performed for the following setting items:

Exposure Time
  ON or OFF of LED Illumination
Image Reduction Ratio
  Parameter setting of the detection icon 253 is performed for the following setting items:
Image Used
  Shape to Be Found
Threshold for Degree of Matching
  Threshold for Contrast
where "Threshold for Degree of Matching" and "Threshold for Contrast" are parameters associated with thresholds in image processing for detection of a workpiece.

In the compensation calculation icon 254, an amount of compensation for compensating a teaching position of a robot is obtained by, e.g., calculating the position of a workpiece in the image, based on the detection result obtained by the detection icon 253, and converting the calculated position in the image into 3-dimensional coordinates in a robot coordinate system.

In a program (to be referred to as a vision program 604 hereinafter) for the program creation area 300A illustrated in FIG. 7, an imaging icon 252 is placed first, an auxiliary icon 257 corresponding to a detection operation is then placed, and two detection icons 253 are placed in the frame of the auxiliary icon 257. The vision program 604 implements the following operations: First, an image of a workpiece is captured by the imaging icon 252. Then, the shape of the entire workpiece is detected by the auxiliary icon 257 for detection, and a feature (e.g., a hole) on the workpiece is detected by the two detection icons 253 in the auxiliary icon 257. This makes it possible to detect a workpiece having two holes formed in it. The coordinates of the workpiece in the robot coordinate system are calculated and set as data for position compensation by the compensation calculation icon 254.

Example 2

Example 2 related to generation and display of an icon or a statement by the teaching device 10 will be given below.

In Example 2, the teaching device 10 generates and displays a statement (text) representing an instruction to use an image captured by an imaging device. FIG. 9 illustrates an exemplary text-based program creation screen 400B generated by the teaching device 10 according to this embodiment, and FIG. 8 illustrates an exemplary text-based program creation screen 140 in a general teaching device, as a comparative example. FIGS. 8 and 9 both illustrate program creation screens for executing the same motion in a robot system including two imaging devices as illustrated in FIG. 1.

FIG. 9 illustrates the program creation screen 400B displayed by the program editing section 13 of the teaching device 10 according to this embodiment. The program creation screen 400B includes a program creation area 300B for performing text-based programming. A popup menu 200B for displaying a list of statements can be displayed by performing a predetermined operation (e.g., an operation for pressing an instruction list button (not illustrated) displayed in the program creation screen 400B) via an input device 19 of the teaching device 10, with the program creation screen 400B being displayed. By moving a cursor to a position having a desired line number in the program creation area 300B, and selecting a desired statement from the popup menu 200B, the operator can insert the statement at the position of the cursor.

Generation and display processing of a statement by the teaching device 10 will be described below with reference to the flowchart illustrated in FIG. 3. In the beginning, upon the start of the teaching device 10, or in response to a predetermined operation performed on the teaching device 10 to open a program creation screen, the processing illustrated in FIG. 3 is started. The teaching device 10 (program editing section 13) first opens the program creation screen 400B (step S1). The instruction generation section 11 then acquires information concerning an imaging device connected to the robot controller 20 from the robot controller 20 (step S2). In this case, information of two vision sensors is acquired. The two cameras are defined as cameras A and B, for the sake of convenience. The instruction generation section 11 generates a statement for each of the two cameras A and B. The instruction generation section 11, for example, generates statements "CAMERA_A VISION RUN_FIND" and "CAMERA_B VISION RUN_FIND" for issuing commands to the cameras A and B, respectively, regarding a statement "VISION RUN_FIND" serving as an instruction to capture an image by an imaging device (step S3). The instruction generation section 11 further generates statements "CAMERA_A VISION GET_OFFSET" and "CAMERA_B VISION GET_OFFSET" for issuing commands to the cameras A and B, respectively, regarding a statement "VISION GET_OFFSET" serving as an instruction to detect the position of a workpiece from the captured image (steps S3 and S4).

The instruction display section 12, for example, includes, in the popup menu 200B, not only a statement associated with control of a robot, but also the statements "CAMERA_A VISION RUN_FIND," "CAMERA_B VISION RUN_FIND," "CAMERA_A VISION GET_OFFSET," and "CAMERA_B VISION GET_OFFSET" associated with the functions of the imaging devices generated by the instruction generation section 11, and displays these statements, in response to a selection operation on an instruction list button (not illustrated) (step S5). The operator can instantaneously know the types and number of imaging devices connected to the robot system by viewing such a popup menu 200B (a list of statements). FIG. 9 illustrates the case where the two cameras are represented as "CAMERA_A" and "CAMERA_B," but, for example, the portion of "CAMERA_A" may be represented as "2D_HANDHELD_CAMERA," and the portion of "CAMERA_B" may be represented as "3D_FIXED_CAMERA," so that "2D_HANDHELD_CAMERA VISION RUN_FIND," "3D_FIXED_CAMERA VISION RUN_FIND," "2D_HANDHELD_CAMERA VISION GET_OFFSET," and "3D_FIXED_CAMERA VISION GET_OFFSET" are included in the popup menu 200B as statements. In this case, the operator can know the types, the number, and the installation positions of imaging devices mounted in the robot system 100.

The operator creates a control program as described in the program creation area 300B by repeating an editing operation for selecting a desired statement from the list of statements displayed in the popup menu 200B and inserting it into a line pointed to by the cursor. In this case, the position of a workpiece is detected by the camera A in accordance with statements (lines 3 and 4) defined to directly specify the camera A, and a motion for gripping the workpiece while compensating the position of a robot, based on the detected position, is implemented (lines 6 to 10). In addition, the position of the workpiece is detected by the camera B in accordance with statements (lines 13 and 14) defined to directly specify the camera B, and a motion for gripping the workpiece while compensating the position of the robot, based on the detected position, is implemented (lines 16 to 20).

A general teaching device performs no processing for generating a statement for each imaging device. Therefore, as illustrated in FIG. 8, in the program creation screen 140 used by the general teaching device, a popup menu 120 for displaying a list of statements displays only statements "VISION RUN_FIND" and "VISION GET_OFFSET" defined to specify no imaging device, as statements associated with an imaging device. In this case, the operator, for example, may preferably select the statement "VISION RUN_FIND" from the popup menu 120, insert it into a program creation area 130, and then select a camera used in the statement "VISION RUN_FIND" as a parameter. In such a popup menu 120, the operator may not be allowed to know the types, the number, and the installation positions of imaging devices mounted in the robot system.

The case where a plurality of imaging devices are placed in the robot system has been described in the above-described embodiment, but even when only one imaging device is placed in the robot system, an icon with the imaging device being selected is displayed in the icon display area 200 in Example 1 (FIGS. 4 and 5), and a statement with the imaging device being selected is displayed in the popup menu 200B in Example 2 (FIG. 9). For example, in Example 1, when only one imaging device (vision sensor 41) is placed in the robot system, the icon 201 is displayed in the icon display area 200. In Example 2, when only one imaging device (camera A) is placed in the robot system, "CAMERA_A VISION RUN_FIND" and "CAMERA_A VISION GET_OFFSET" are displayed in the popup menu 200B. Therefore, even when only one imaging device is placed in the robot system, the operator may preferably perform no operation for selecting a camera as detailed setting for an icon or a statement.

Hence, according to this embodiment, in programming of a control program for an industrial machine, it is possible to reduce the burden on an operator who creates a control program including an instruction corresponding to the function of an imaging device.

Although the present invention has been described above with reference to exemplary embodiments, it will be appreciated by those skilled in the art that the foregoing and various other changes, omissions, or additions may be made to the above-described embodiments without departing from the scope of the invention.

The above-described embodiment is related to creation of a control program in a robot system, but it is applicable to a programming device for a control program in a system formed by connecting one or more imaging devices to a controller for any of a machine tool and various other industrial machines.

The functional blocks of the teaching device 10 illustrated in FIG. 2 may be implemented by executing various types of software stored in the storage device by the CPU of the teaching device 10, or may be implemented by a configuration mainly formed by hardware such as an ASIC (Application Specific Integrated Circuit).

The functional layout of the functional block diagram illustrated in FIG. 2 is merely an example, and some of the functions arranged in the teaching device 10 may be arranged in the robot controller 20.

The timing at which the teaching device 10 (instruction generation section 11) acquires information concerning an imaging device from the robot controller 20 and generates an icon or a statement is not limited to the example given in the above-described embodiment, and various examples are available such as the timing at which an imaging device is connected to the robot controller 20. The timing at which the teaching device 10 (instruction generation section 11) acquires information concerning an imaging device from the robot controller 20 and generates an icon or a statement may be set to one of predetermined start timings such as the time of the start of the teaching device 10, the time of connection of an imaging device to the robot controller 20, and the time at which the program creation screen 400 is opened, or may be set to a plurality of timings among these start timings.

A program for executing the instruction generation and display processing of FIG. 3 in the above-described embodiment can be recorded on various computer-readable recording media (e.g., a ROM, an EEPROM, a semiconductor memory such as a flash memory, a magnetic recording medium, or an optical disk such as a CD-ROM or a DVD-ROM).

REFERENCE SIGNS LIST

1 Workpiece
2 Work table
10 Teaching device
11 Instruction generation section
12 Instruction display section
13 Program editing section
14 Program generation section
18 Display device
19 Input device
20 Robot controller
30 Robot
41, 42 Vision sensor
31 Hand
200 Icon display area
200B Popup menu
300, 300B Program creation area
400, 400B Program creation screen

The invention claimed is:

1. A programming device for performing programming of an industrial machine, the device comprising:

an instruction generation section configured to acquire information concerning an imaging device connected to a controller for the industrial machine, and generate one of an icon and a statement representing an instruction to use an image captured by an imaging device, based on the acquired information, such that detailed setting including selection of an imaging device can be made to the one of the icon and the statement; and an instruction display section configured to display the generated one of the icon and the statement on a display screen.

2. A programming device for performing programming of an industrial machine, the device comprising:

an instruction generation section configured to acquire information concerning an imaging device connected to a controller for the industrial machine, and generate one of an icon and a statement representing an instruction to use an image captured by the imaging device, based on the acquired information; and an instruction display section configured to display the generated one of the icon and the statement on a display screen, wherein the instruction generation section acquires the information concerning the imaging device from the controller connected to the programming device, at least at one of predetermined start timings including a time of start of the programming device, a time of connection of the imaging device to the controller, and a time at which a program creation screen is opened.

3. The programming device according to claim 1, wherein the instruction generation section acquires the information concerning the imaging device from the controller connected to the programming device, in response to a predetermined operation performed to start a program creation screen via an input device of the programming device.

4. The programming device according to claim 1, wherein the information concerning the imaging device includes information concerning at least one of a type of the imaging device, an installation position of the imaging device, and a port connected to the imaging device.

5. The programming device according to claim 4, wherein the information concerning the imaging device comprises information concerning a plurality of imaging devices connected to the controller, and the instruction generation section generates one of the icon and the statement representing an instruction to use an image captured by each of the plurality of imaging devices, in a representational form that allows identification of the each of the plurality of imaging devices.

6. The programming device according to claim 5, wherein the information concerning the imaging device includes information concerning a type of each of the plurality of imaging devices, and the instruction generation section generates one of the icon and the statement representing an instruction to use an image captured by each of the plurality of imaging devices, in a representational form that allows identification of the type of the each of the plurality of imaging devices.

7. The programming device according to claim 5, wherein the information concerning the imaging device includes information concerning an installation position of each of the plurality of imaging devices, and the instruction generation section generates one of the icon and the statement representing an instruction to use an image captured by each of the plurality of imaging devices, in a representational form that allows identification of the installation position of the each of the plurality of imaging devices.

8. A programming device for performing programming of an industrial machine, the device comprising:
- an instruction generation section configured to acquire information concerning an imaging device connected to a controller for the industrial machine, and generate one of an icon and a statement representing an instruction to use an image captured by the imaging device, based on the acquired information;
- an instruction display section configured to display the generated one of the icon and the statement on a display screen; and
- a program editing section configured to display a program creation screen for performing the programming and receive an editing operation on the program creation screen, wherein
- the instruction generation section generates the icon representing the instruction to use the image captured by the imaging device,
- the instruction display section displays the generated icon in a predetermined display area within the program creation screen,
- the program creation screen includes a program creation area for creating a program by placing an icon selected from the predetermined display area in the program creation area, and
- the program editing section displays, in response to an operation for selecting the icon placed in the program creation area, a live image of the imaging device corresponding to the selected icon.

* * * * *